US012640962B2

(12) United States Patent
Fujiwara et al.

(10) Patent No.: US 12,640,962 B2
(45) Date of Patent: May 26, 2026

(54) SETTING DEVICE, SETTING METHOD, AND SETTING PROGRAM

(71) Applicant: NTT, Inc., Tokyo (JP)

(72) Inventors: Takayuki Fujiwara, Tokyo (JP); Satoshi Nakatsukasa, Tokyo (JP); Yuta Watanabe, Tokyo (JP)

(73) Assignee: NTT, Inc., Tokyo (JP)

( * ) Notice: Subject to any disclaimer, the term of this patent is extended or adjusted under 35 U.S.C. 154(b) by 287 days.

(21) Appl. No.: 18/274,250

(22) PCT Filed: Jan. 28, 2021

(86) PCT No.: PCT/JP2021/003118
§ 371 (c)(1),
(2) Date: Jul. 26, 2023

(87) PCT Pub. No.: WO2022/162847
PCT Pub. Date: Aug. 4, 2022

(65) Prior Publication Data
US 2024/0097941 A1 Mar. 21, 2024

(51) Int. Cl.
*H04L 12/66* (2006.01)
(52) U.S. Cl.
CPC .................................... *H04L 12/66* (2013.01)
(58) Field of Classification Search
CPC ...................................................... H04L 12/66
See application file for complete search history.

(56) References Cited

U.S. PATENT DOCUMENTS 6,532,233 B1 * 3/2003 Matsunaga ......... H04L 12/1859
370/467
2013/0205296 A1 * 8/2013 Cardona .................. G06F 9/542
718/1

2015/0381523 A1 * 12/2015 Kure ..................... H04L 67/146
370/254
2016/0337423 A1 * 11/2016 Uchida ............... H04L 12/4633
2019/0014039 A1 * 1/2019 Shen ................... H04L 41/0895
2024/0097941 A1 * 3/2024 Fujiwara ................ H04L 12/66

FOREIGN PATENT DOCUMENTS

JP 2002077216 A 3/2002

OTHER PUBLICATIONS

English translation of International Search Report for PCT/JP2021/003118, mailed May 18, 2021 (Year: 2021).*
"Source Filtering in IP Multicast Routing"; Yang et al; IEEE Transactions on Broadcasting, vol. 52, No. 4, Dec. 2006 (Year: 2006).*

* cited by examiner

*Primary Examiner* — Benjamin H Elliott, IV

(57) ABSTRACT

A filter setting device (20) includes a shared filter DB (21) having a shared filter information table (211) in which information of each shared filter is recorded and a shared filter application destination table (212) in which a transfer device of an application destination of each shared filter is recorded; a shared filter creation unit (22) for determining new creation of a shared filter or diversion of an existing shared filter by referring to a shared filter information table (211) and a shared filter application destination table (212) on the basis of an instruction of a host server (10), in the L3 transfer technology; and a configuration input unit (23) for generating a configuration on the basis of a determination result of the shared filter creation unit (22), and setting a shared filter to be shared among a plurality of IF in a transfer device (30).

20 Claims, 22 Drawing Sheets

Fig. 2

```
ipv6 access-list Filter1
 permit ipv6 any aaa
 permit ipv6 CCC ccc
 ...
```

Fig. 3

```
interface Port-channel1.1
(OMISSION)
ipv6 mld access-group Filter1
...
```

Fig. 5

SHARED FILTER INFORMATION TABLE ⟨211

| FILTER NAME | SOURCE | GROUP |
|:---:|:---:|:---:|
| Filter1 | AAA | bbb |
| Filter2 | AAA | aaa |
| Filter3 | CCC | ccc |
| ... | ... | ... |

Fig. 6

SHARED FILTER APPLICATION
DESTINATION TABLE          ⌒212

| FILTER NAME | APPLIED TRANSFER DEVICE | APPLIED USER IF |
|---|---|---|
| Filter1 | DDD | 001 |
| Filter1 | EEE | 003 |
| Filter3 | FFF | 002 |
| ... | ... | ... |

| FILTER NAME | SOURCE | GROUP | |
|---|---|---|---|
| Filter1 | AAA | bbb | R1 |
| Filter2 | AAA | aaa | |
| Filter3 | CCC | ccc | |
| ... | ... | ... | |

| FILTER NAME | APPLIED TRANSFER DEVICE | APPLIED USER IF | |
|:-----------:|:-----------------------:|:---------------:|---|
| Filter1 | DDD | 001 | |
| Filter1 | EEE | 003 | }R2 |
| Filter3 | FFF | 002 | |
| ... | ... | ... | |

| FILTER NAME | SOURCE | GROUP | |
|---|---|---|---|
| Filter1 | AAA | bbb | R3 |
| Filter2 | AAA | aaa | |
| Filter3 | CCC | ccc | |
| ... | ... | ... | |

| FILTER NAME | APPLIED TRANSFER DEVICE | APPLIED USER IF |
|---|---|---|
| Filter1 | DDD | 001 |
| Filter3 | FFF | 002 |
| ... | ... | ... |

| FILTER NAME | SOURCE | GROUP |
|-------------|--------|-------|
| Filter2 | AAA | aaa |
| Filter3 | CCC | ccc |
| ... | ... | ... |

| FILTER NAME | APPLIED TRANSFER DEVICE | APPLIED USER IF |
|---|---|---|
| Filter3 | FFF | 002 |
| ... | ... | ... |

Fig. 16

TRANSFER DEVICE MC SOURCE
ASSOCIATION TABLE          ⌐213

| TRANSFER DEVICE NAME | DISTRIBUTOR | SOURCE ADDRESS |
|---|---|---|
| TRANSFER DEVICE 1 | CARRIER 1 | AAA |
| TRANSFER DEVICE 1 | CARRIER 2 | CCC |
| TRANSFER DEVICE 2 | CARRIER 1 | DDD |
| ... | ... | ... |

SETTING DEVICE, SETTING METHOD, AND SETTING PROGRAM

CROSS-REFERENCE TO RELATED APPLICATIONS

This application is a U.S. National Stage Application filed under 35 U.S.C. § 371 claiming priority to International Patent Application No. PCT/JP2021/003118, filed on 28 Jan. 2021, the disclosure of which is hereby incorporated herein by reference in its entirety.

TECHNICAL FIELD

The present invention relates to a setting device, a setting method, and a setting program.

BACKGROUND ART

Multicast is utilized for the purpose of real-time video distribution through the Internet. Since multicast is a part of pay broadcast service for a communication carrier, it is necessary to limit a viewable channel in accordance with a contract situation of a user.

However, the number of filters that can be set in the transfer device has an upper limit value, and there is a problem that when filters are prepared for each user and for each use, the number of filters to be set increases and exceeds the upper limit.

Here, as a conventional technique, a technique having an L2 filter function in the outside of the transfer device is proposed (for example, refer to PTL 1). This can be seen as a method for reducing the number of filter settings per device by separating the filter conditions by L2 and L3 and leaving the filter conditions of L2 to an external device.

CITATION LIST

Patent Literature

[PTL 1] Japanese Patent Application Laid-open No. 2002-077216

SUMMARY OF INVENTION

Technical Problem

However, since the multicast is classified into L3 transfer techniques, the multicast cannot be separated by L2 and L3. In addition, in the prior art, another transfer device having a filter function is placed between the terminal and the router, so that the equipment cost is increased, and the operation for operating is increased because it is necessary for both the transfer device and the device having the filter function. In particular, since the filter setting object devices are distributed for the same service (multicast), the number of setting places is increased and the time and labor in operation are increased when a new user is acquired or a user is withdrawn.

The present invention addresses the above problems with an object of providing a setting device, a setting method, and a setting program that can reduce the total number of filters set in the transfer device in the L3 transfer technology.

Solution to Problem

In order to solve and achieve the above-mentioned problem, a setting device according to the present invention includes:

a recording unit having a first table in which information on each shared filter is recorded and a second table in which a transfer device to which each shared filter is applied is recorded;

a creation unit for determining whether new creation of a shared filter or diversion of an existing shared filter by referring to a first table and a second table on the basis of an instruction from a host server in the L3 transfer technology;

and a setting unit for generating a configuration on the basis of a determination result of the creation unit, and setting a shared filter shared among the plurality of IF in a transfer device.

Advantageous Effects of Invention

According to the present invention, in the L3 transfer technology, the total number of filters set in the transfer device can be reduced.

BRIEF DESCRIPTION OF DRAWINGS

FIG. 2 is a diagram illustrating an example of configuration information.

FIG. 3 is a diagram illustrating an example of configuration information.

FIG. 5 is a diagram showing an example of the data configuration of a shared filter information table shown in FIG. 4.

FIG. 6 is a diagram showing an example of the data configuration of a shared filter application destination table shown in FIG. 4.

FIG. 7-1 is a diagram showing an example of a shared filter information table shown in FIG. 4.

FIG. 7-2 is a diagram showing an example of a shared filter application destination table shown in FIG. 4.

FIG. 8-1 is a diagram showing an example of a shared filter information table shown in FIG. 4.

FIG. 8-2 is a diagram showing an example of a shared filter application destination table shown in FIG. 4.

FIG. 9-1 is a diagram showing an example of a shared filter information table shown in FIG. 4.

FIG. 9-2 is a diagram showing an example of a shared filter application destination table shown in FIG. 4.

FIG. 16 is a diagram showing an example of the data configuration of an association between transfer device and MC source table shown in FIG. 15.

DESCRIPTION OF EMBODIMENTS

Hereinafter, an embodiment of the present invention will be described in detail with reference to the drawings. The present invention is not limited to the present embodiment. Further, in the description of the drawings, the same parts are denoted by the same reference signs.

Hereinafter, an embodiment of the present invention will be described in detail with reference to the drawings. The present invention is not limited to the present embodiment. Further, in the description of the drawings, the same parts are denoted by the same reference signs.

Embodiment 1

Outline of Embodiment 1

In the present embodiment, filter setting in the transfer device will be described in a multicast (video distribution service or the like) classified into L3 transfer technology.

Figure 1:
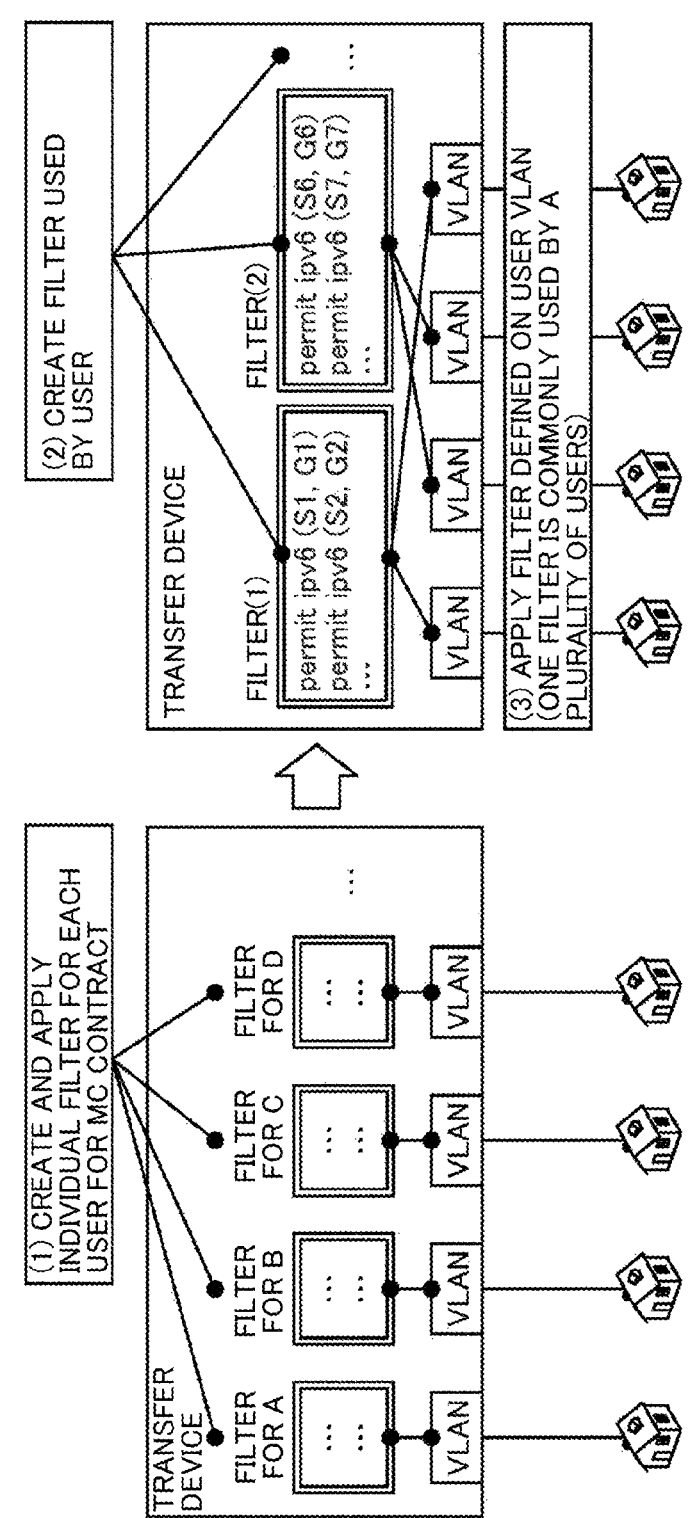
FIG. 1 is a diagram showing an outline of filter setting according to an embodiment 1.

FIG. 1 is a diagram showing an outline of filter setting in embodiment 1. In a conventional manner, an individual filter is created for each user for a multicast (MC) and applied (FIG. 1 (1)).

In the case of multicast, the source address and the group address which are frequently used are generally determined. Therefore, it is considered that some of the filters for limiting viewing currently set for each user can be shared. In the embodiment 1, a filter having contents corresponding to a user's viewing contract or the like is created for a multicast filter (FIG. 1 (2)), and this filter is applied to a user VLAN (virtual LAN). Further, a method for setting the shared use of a filter in which a plurality of users can use one filter in common if the filter having the same condition has been already set in the device when a user newly applying the filter occurs will be described.

BACKGROUND ART

In this case, a device (a router or the like) located at a place closest to the user among transfer devices prepared by the communication carrier is called an "edge", and a VLAN is set in a physical port that the edge has.

A user can be identified by three information: information (IP address or the like) of a transfer device accommodating the user; determine a physical port identification number of the transfer device accommodating the user; and a VLAN ID assigned to the user, and such a combination of information is called a "user identifier".

The interface (IF) in which the user is accommodated is called "user IF". That a user subscribes to the video distribution service using multicast is to submit a multicast setting (multicast receiver search (MLD: multicast Listener Discovery) etc.) to the user IF.

In order to allow a user to view only a contracted channel, a filter is applied to the user IF. In the ACL (Access Control List), combinations of a source address and a group address of a multicast which can be viewed by the user are listed. It is assumed that combinations of channels that a user can view are diversified, and this ACL is prepared for each user.

For reference, filter setting to a normal router will be described. It is assumed that the router is not directly set by the maintenance person but is submitted via the operation system (herein after, Ops).

The filter is held in combination of a filter name and its contents inside the transfer device. FIG. 2 is a diagram showing an example of the configuration information. FIG. 2 shows a filter having the name "Filter1". The first line in FIG. 2 indicates that the communication of the source address "any" and the group address "aaa" is permitted. The second line in FIG. 2 indicates that communication with the source address "CCC" and the group address "ccc" is permitted. Other than the above, "deny" is automatically performed.

Applying a filter to the user IF is as configuration associating the user IF with a filter name. FIG. 3 is a diagram showing an example of configuration. In the example shown in FIG. 3, the user IF is the name "Port-channel1.1", and the VLAN setting of the IF and the like are included in the portion of "(omission)". "Filter1" is applied to the user IF.

[Network System]

Figure 4:
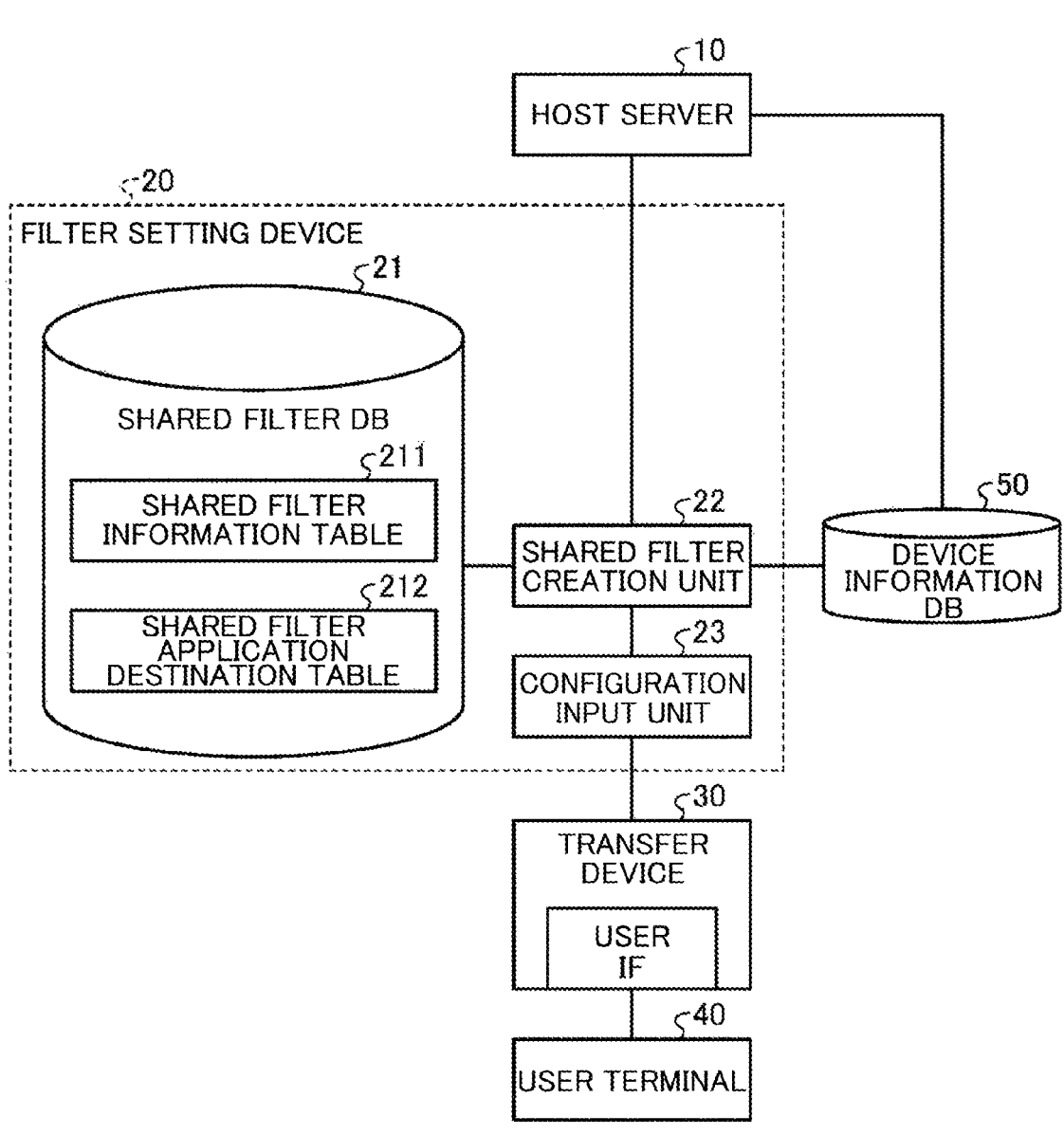
FIG. 4 is a diagram showing schematically an example of the network system according to the embodiment 1.

The network system according to the embodiment 1 will be described. FIG. 4 is a diagram schematically showing an example of a network system according to the embodiment 1. As shown in FIG. 4, the network system according to the embodiment 1 includes a host server 10, a filter setting device 20, a transfer device 30, and a device information database (DB) 50.

The host server 10 is an operation device of a higher rank Ops or operation device of a maintenance person, inputs various parameters for setting a filter to the filter setting device 20, and instructs filter setting.

A filter setting device 20 sets a shared filter shared among the plurality of IF in the transfer device. The filter setting device 20 determines the new creation of the shared filter or the diversion of the existing shared filter on the basis of an instruction from the host server 10, and sets the shared filter to be shared among the plurality of IF in the transfer device 30.

The transfer device 30 is an IP termination device accommodating a user terminal 40. The transfer device 30 applies the filter set by the filter setting device 20 to the user IF.

The user terminal 40 is a terminal device operated by a user who tries to use the multicast distribution service.

The device information DB 50 is a DB prepared by a communication carrier to grasp the state of communication equipment in the own communication network.

[Filter Setting Device]

Next, the filter setting device 20 will be described. The filter setting device 20 is realized by that a predetermined program is read into a computer or the like including, for example, a ROM (Read only Memory), a RAM (Random Access Memory), a CPU (Central Processing Unit) and the like, the CPU executes a predetermined program. The filter setting device 20 has a communication interface for transmitting and receiving various kinds of information to and from other devices connected via a network or the like. For example, the filter setting device 20 has an NIC (Network Interface Card), or the like, and communicates with another device via a telecommunication line such as a LAN (Local Area Network) or the Internet.

The filter setting device 20 includes a shared filter DB 21 (storage unit), a shared filter creation unit 22 (creation unit), and a configuration input unit 23 (setting unit).

The shared filter DB 21 holds information on the created shared filter, and holds information indicating which shared filter is applied to which user. The shared filter DB 21 has a shared filter information table 211 (first table) and a shared filter application destination table 212 (second table).

FIG. 5 is a diagram showing an example of the data configuration of the shared filter information table 211 shown in FIG. 4. As shown in FIG. 5, the filter names, sources and groups of the already created shared filters are recorded in the shared filter information table 211 in association with each other.

FIG. 6 is a diagram showing an example of data configuration of the shared filter application destination table 212 shown in FIG. 4. As shown in FIG. 6, the filter name applied transfer device and the applied user IF of the created shared filter are recoded in the shared filter application destination table 212 in association with each other.

A shared filter creation unit 22 refers to a shared filter information table 211 and a shared filter application destination table 212 on the basis of an instruction from the host server 10 in an L3 transfer technology to determine new creation of a shared filter or diversion of an existing shared filter.

The processing of the shared filter creation unit 22 when the user addition is instructed from the host server 10 will be described. First, a case will be described in which the information of the shared filter corresponding to the instruction from the host server 10 is stored in the shared filter information table 211 and the transfer device 30 accommodating the terminal of the user instructed to be added is stored in the shared filter application destination table 212. In this case, the shared filter creation unit 22 determines that the shared filter corresponding to the instruction from the host server 10 and other IF shared filters of the transfer device 30 accommodating the user terminal 40 are shared.

When the user addition is instructed from the host server 10, the case where the information of the shared filter corresponding to the instruction from the host server 10 is present in the shared filter information table 211 and the transfer device 30 accommodating the user terminal 40 of the user instructed to be added is not present in the shared filter application destination table 212 will be described. In this case, the shared filter creation unit 22 determines that the shared filter corresponding to the instruction from the host server 10 is added to the transfer device 30 accommodating the user terminal 40. At the same time, the shared filter creation unit 22 adds a transfer device 30 housing the user terminal 40 to a shared filter application destination table 212 as an application destination of the shared filter corresponding to an instruction from the host server 10.

When the user addition is instructed from the host server 10, the case where the information of the shared filter corresponding to the instruction from the host server 10 is not in the shared filter information table 211 will be described. In this case, the shared filter creation unit 22 newly creates a shared filter corresponding to an instruction from the host server 10, and determines that the created shared filter is applied to a transfer device 30 accommodating a user terminal 40 of a user instructed to be added. At the same time, the shared filter creation unit 22 records the created information of the shared filter and its application destination in a shared filter information table 211 and a shared filter application destination table 212.

The configuration input unit 23 generates a configuration on the basis of the determination result of the shared filter creation unit 22, and sets a filter shared between the plurality of IF in the transfer device 30. The configuration input unit

23 receives the condition of the filter determined by the shared filter creation unit 22, and generates a configuration in a form that can be input to a subordinate transfer device.

[The State of the Filter DB]

When the host server 10 sets the shared filter for MC, the filter setting device 20 is in the following four states. FIG. 7-1, FIG. 8-1, and FIG. 9-1 are diagrams showing an example of the shared filter information table 211 shown in FIG. 4. FIG. 7-2, FIG. 8-2, and FIG. 9-2 are diagrams showing an example of the shared filter application destination table 212 shown in FIG. 4.

FIG. 7-1 to FIG. 9-2 are example of the case where the input parameters from the host server 10 are the following contents. Note that, the port number of the application destination user IF is a value derived from the input user identifier.

Input source address: AAA

Input group address: bbb

The place of the application destination user IF: Port 2 of the transfer device EEE The state 1 is a state in which the information of the shared filter whose setting is inputted exists in the shared filter information table 211 and the shared filter application destination table 212. State 1 is a state in which a shared filter having the same contents has been created in the past, and a user IF to which the same shared filter has been applied is already present in the transfer device 30. The state 1 is, for example, a state in which information of "Filter1" to which setting is input is present in any table as shown in a row R1 of a shared filter information table 211-1 (refer to FIG. 7-1), and a row R2 of a shared filter application destination table 212-1 (refer to FIG. 7-2).

The state 2 is a state in which the information of the shared filter whose setting is inputted is present only in the shared filter information table 211. State 2 is a state in which a shared filter having the same content has been created in the past, but there is no user IF applied to the transfer device 30 which is the target of setting this time. In the state 2, for example, the information of "Filter1" is present in the row R3 of the shared filter information table 211-1 (refer to FIG. 8-1), but the information of "Filter1" is absent in the shared filter application destination table 212-1 (refer to FIG. 8-2).

The state 3 is a state in which the information of the filter whose setting is inputted is present only in the shared filter application destination table 212. However, since the shared filter is applied to the transfer device 30 after the shared filter is created, the state 3 is in an unobtainable state, the state 3 is not considered.

The state 4 is a state in which there is no information on the shared filter to which the setting is applied in both the shared filter information table 211 and the shared filter application destination table 212. The state 4 is a state in which the same shared filter has not been created in the past or has been erased. The state 4 is, for example, a case where there is no information "Filter1" in any of the shared filter information table 211-3 (refer to FIG. 9-1) and the shared filter application destination table 212-3 (refer to the FIG. 9-2).

[Filter Creation Processing]

Figure 10:
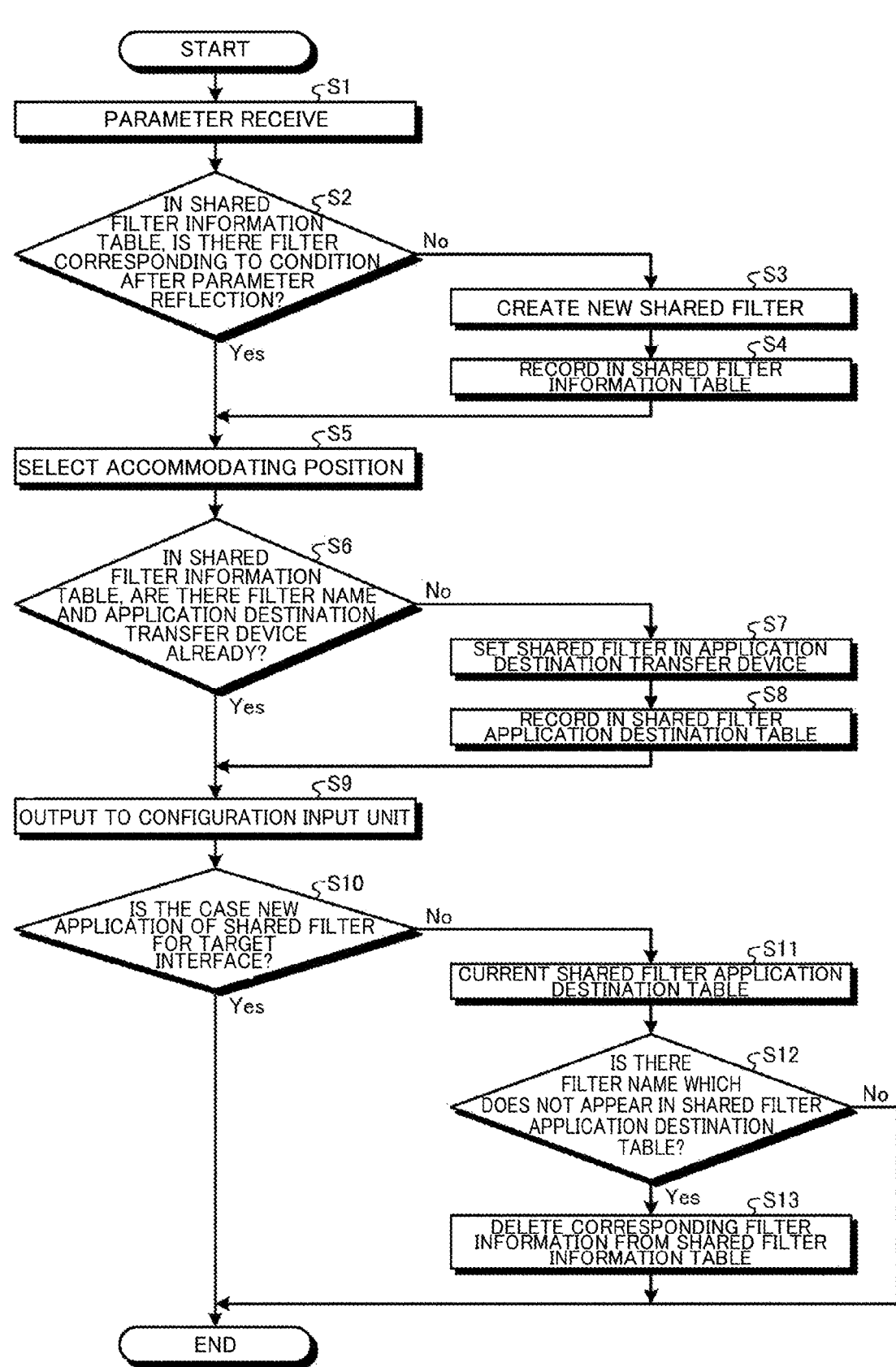
FIG. 10 is a flow chart showing a processing procedure executed in a shared filter creation unit shown in FIG. 4.

Next, the processing executed by the shared filter creation unit 22 will be described. FIG. 10 is a flow chart showing the processing procedure of the filter creation processing executed by the shared filter creation unit 22 shown in FIG. 4. The following processing is executed when a new shared filter is created and applied to the user IF to which the shared filter is not set, and the same processing is executed when the shared filter applied to the user IF is changed to another shared filter (created newly or an existing shared filter).

As shown in FIG. 10, a shared filter creation unit 22 starts filter creation processing by receiving parameters indicating setting information of the shared filter from a host server 10 (step S1). The parameters are filter conditions, specifically, user identifier, source address, group address, etc., in the case of multicast.

The shared filter creation unit 22 refers to a shared filter information table 211, and determines whether or not there is a filter corresponding to a condition after the parameter reflection in the shared filter information table 211 (step S2).

When there is no filter corresponding to the condition after the parameter reflection in the shared filter information table 211 (step S2: No), the shared filter creation unit 22 creates a new shared filter corresponding to the parameters received from the host server 10 (step S3). Then, the shared filter creation unit 22 records the created information of the shared filter in the shared filter information table 211 (step S4).

When there is a filter corresponding to the condition after the parameter reflection in the shared filter information table 211 (step S2: Yes), or after the step S4 ends, the shared filter creation unit 22 specifies a device of a setting destination and a user IF by the user identifier, and selects an accommodating position of the user terminal (step S5). The shared filter creation unit 22 determines whether or not a filter name and an application destination transfer device already exist in a shared filter application destination table 212 (step S6).

When the filter name and the application destination transfer device do not exist in the shared filter application destination table 212 (step S6: No), the shared filter creation unit 22 sets the shared filter to the transfer device 30 of the application destination (step S7). Then, a shared filter creation unit 22 records the set shared filter and the transfer device 30 of the application destination in the shared filter application destination table 212 (step S8).

When a filter name and an application destination transfer device are present in the shared filter application destination table 212 (step S6: Yes), or after step S8 end, the shared filter creation unit 22 outputs the determination result to a configuration input unit 23 (step S9). The configuration input unit 23 receives the condition of the filter determined by the shared filter creation unit 22, generates a configuration in a form that can be input to a subordinate transfer device, and sets a filter to be shared among the plurality of IF in the transfer device 30.

Then, the shared filter creation unit 22 determines whether or not the shared filter is newly applied to the target user IF (step S10). When the shared filter is newly applied to the target user IF (step S10: Yes), since there is no shared filter applied to the user IF in the past and update of the shared filter DB 21 is not required, the shared filter creation unit 22 terminates the process.

When the shared filter is not newly applied to the target user IF (step S10: No), the shared filter creation unit 22 currents the shared filter application destination table 212 (step S11). Then, the shared filter creation unit 22 determines whether or not a filter name which does not appear in the shared filter application destination table 212 is present in the shared filter information table 211 (step S12).

When a filter name which does not appear in the shared filter application destination table 212 is in the shared filter information table 211 (step S12: Yes), since the not applied shared filter is still recorded, the shared filter creation unit 22 deletes the corresponding filter information from the shared filter information table 211 (step S13), and updates the shared filter DB 21. On the other hand, when a filter name which does not appear in the shared filter application destination table 212 is not in the shared filter information table 211 (step S12: No), since information of the shared filter actually applied to the transfer device 30 is properly recorded in the shared filter DB 21, the shared filter creation unit 22 terminates the process.

[Filter Setting Processing Example 1]

Figure 11:
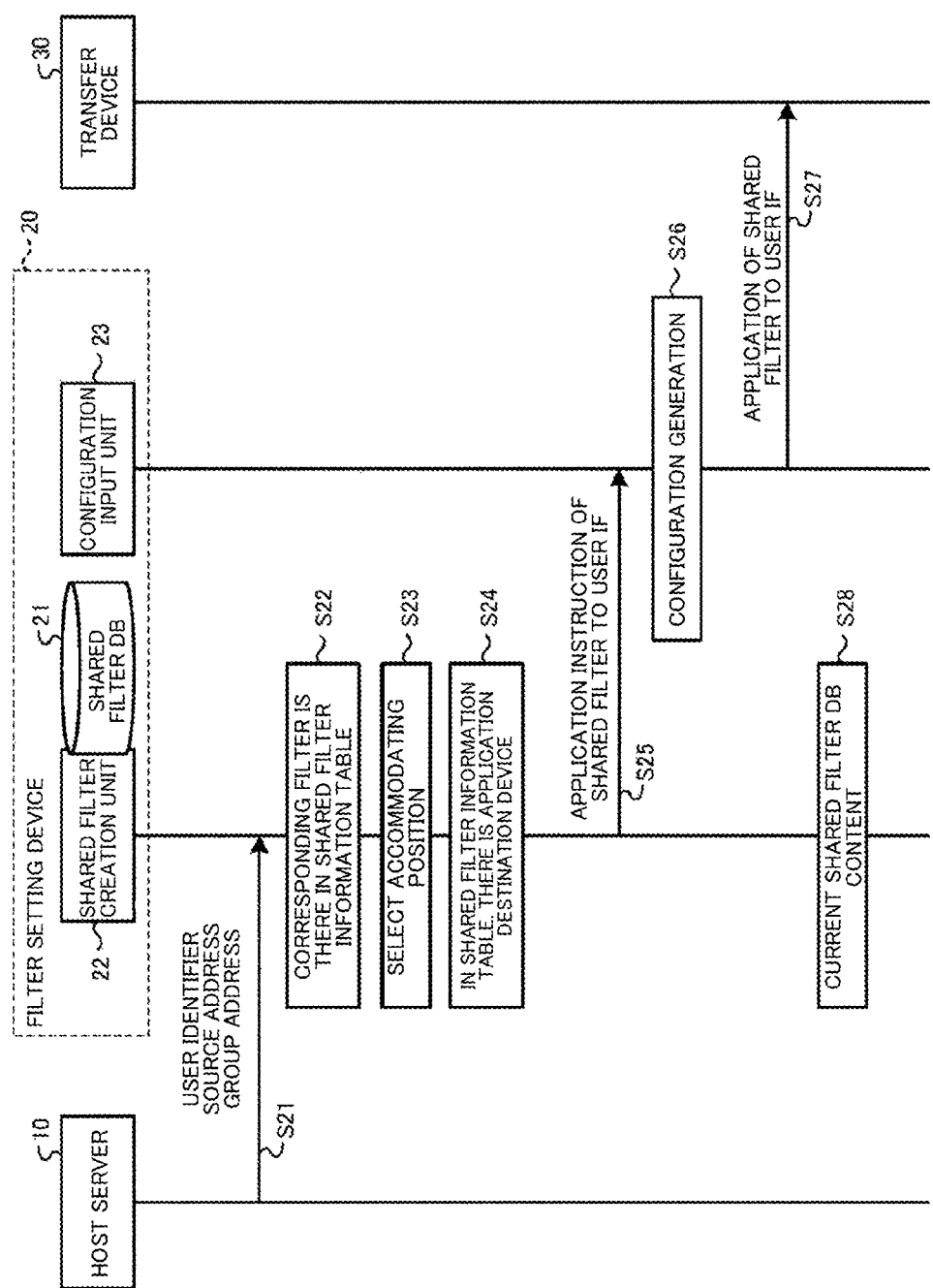
FIG. 11 is a sequence diagram showing a processing procedure of filter setting processing according to the embodiment 1.

Next, the filter setting processing executed by the filter setting device 20 will be described. First, state 1, i.e., adding a user IF to which an already existing shared filter is to be applied, will be described. Note that, the shared filter has already been applied to another user IF of the transfer device 30. FIG. 11 is a sequence diagram showing a processing procedure of the filter setting processing according to the embodiment 1.

The host server 10 transmits parameters of a user identifier, a source address and a group address which are setting information for the MC new user to the filter setting device 20 (step S21).

In the filter setting device 20, a shared filter creation unit 22 collates input information with the shared filter information table 211 of a shared filter DB. In the case of the state 1, since there is an existing shared filter corresponding to a condition after the parameter reflection in the shared filter information table (step S22), the shared filter creation unit 22 specifies an application destination device and a user IF of the shared filter by a user identifier, and selects an accommodating position (step S23). The shared filter creation unit 22 confirms whether an existing shared filter has been set in a device to be set. In the case of the state 1, the filter name and the application destination device are already recorded in the shared filter application destination table (step S24).

The shared filter creation unit 22 inputs information on a shared filter to be applied and a shared filter application instruction to the user IF to a configuration input unit 23 (step S25). The configuration input unit 23 generates a configuration in accordance with input information by the shared filter generation part 22 (step S26), and inputs a shared filter application command to the user IF to the transfer device 30 (step S27). Thus, the transfer device 30 sets the shared filter to the user IF of the application destination. The shared filter creation unit 22 currents the contents of the shared filter DB 21 by executing step S10 to step S13 of FIG. 10 (step S28).

[Filter Setting Processing Example 2]

Figure 12:
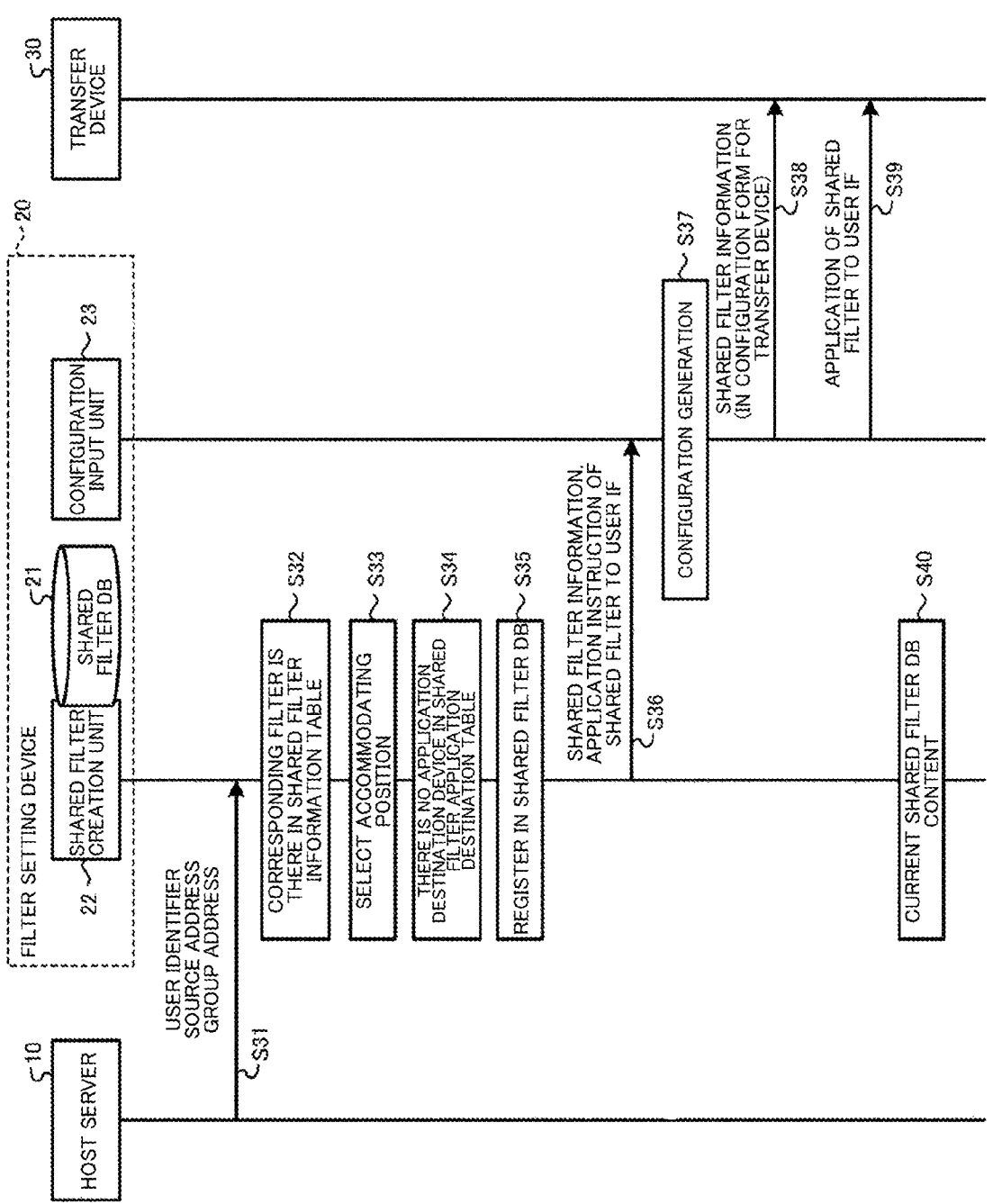
FIG. 12 is a sequence diagram showing another processing procedure of filter setting processing according to the embodiment 1.

Next, state 2, i.e., newly adding an already existing shared filter to a transfer device 30 to be set, will be described. It should be noted that the already existing shared filter is not applied to any user IF of the transfer device 30 to be set. FIG. 12 is a sequence diagram showing a processing procedure of the filter setting processing according to the embodiment 1.

The step S31 and the step S32 of FIG. 12 are the same processing as the step S21 and the step S22 of FIG. 11. In the case of the state 2, since there is an existing shared filter corresponding to the condition after the parameter reflection in the shared filter information table (step S32), the shared filter creation unit 22 selects an accommodating position (step S33).

The shared filter creation unit 22 confirms whether or not the existing shared filter has been set in a device to be set. In the case of the state 2, the application destination device of the shared filter is not recorded in the shared filter application destination table 212 (step S34). Therefore, the shared filter creation unit 22 records the shared filter to be set, the transfer device 30 of the application destination, and the user IF in the shared filter application destination table 212 (step S35).

The shared filter creation unit 22 inputs information on a shared filter to be applied and a shared filter application instruction to the user IF to the configuration input unit 23 (step S36). The configuration input unit 23 generates a configuration in accordance with input information by the shared filter generation unit 22 (step S37), and inputs the shared filter information and a shared filter application command to the user IF to the transfer device 30 (step S38, S39). Thus, the transfer device 30 sets the shared filter to the user IF of the application destination. Note that, step S40 is the same processing as step S28 of FIG. 11.

[Filter Setting Processing Example 3]

Figure 13:
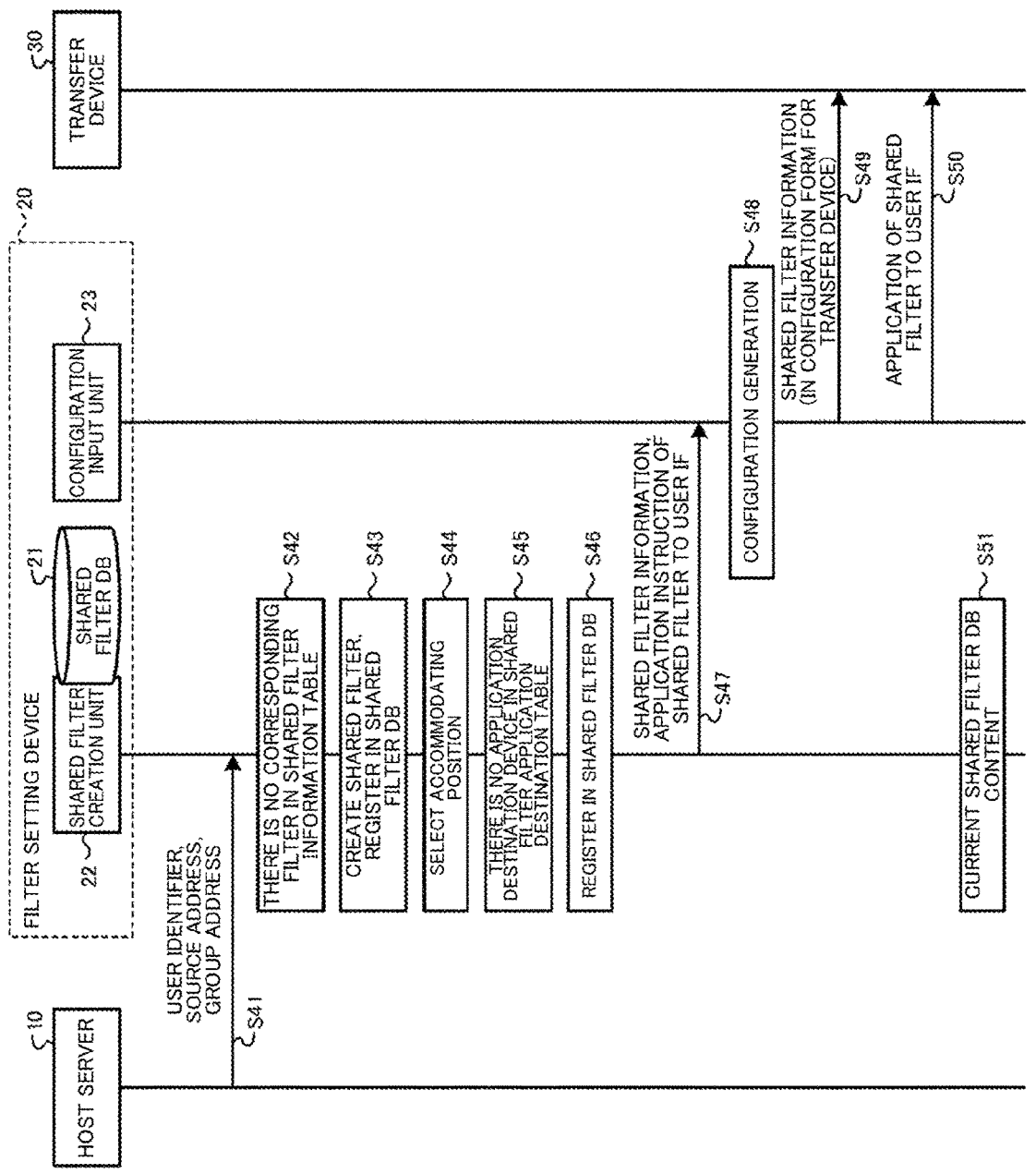
FIG. 13 is a sequence diagram showing another processing procedure of filter setting processing according to the embodiment 1.

Next, state 4, i.e., in a state where there is no information on the filter to which the setting is applied in both the shared filter information table 211 and the shared filter application destination table 212, a case where a new shared filter is created and newly set in the transfer device 30 will be described. FIG. 13 is a sequence diagram showing another processing procedure of the filter setting processing according to the embodiment 1.

The step S41 of FIG. 13 is the same processing as the step S21 of FIG. 11. In the case of the state 4, since there is no existing shared filter corresponding to the condition after the parameter reflection in the shared filter information table (step S42), a shared filter creation unit 22 creates a new shared filter, and registers the filter to the shared filter information table 211 of the shared filter DB 21 (step S43).

The shared filter creation unit 22 selects an accommodating position (step S44). In the state 4, since the shared filter is newly created, the shared filter application destination table 212 does not record the application destination device (step S45). Therefore, the shared filter creation unit 22 records the shared filter to be set, the transfer device 30 of the application destination, and the user IF in the shared filter application destination table 212 (step S46). Step S47 to Step S51 are the same as step S36 to Step S40 shown in FIG. 12.

Effects of Embodiment 1

As described above, the filter setting device 20 in the embodiment 1 has the shared filter information table 211 in which information on each shared filter is recorded and the shared filter application destination table 212 in which transfer devices to which each shared filter is applied are recorded. Then, the filter setting device 20 refers to the shared filter information table 211 and the shared filter application destination table on the basis of an instruction from the host server 10 in the L3 transfer technology, determines new creation of the shared filter or diversion of an existing shared filter, generates a configuration on the basis of a determination result, and sets a filter shared between the plurality of IF in the transfer device 30.

Therefore, according to the filter setting device 20 according to the embodiment 1, the number of filters can be reduced because the filters are shared among the plurality of if of the transfer device 30. Further, since the filter setting device 20, with reference to a shared filter information table 211 and a shared filter application destination table, executes addition, update, and deletion of shared filter automatically, the reduction of operation can be realized.

Embodiment 2

The following will describe the present embodiment. In the embodiment 2, the shared filter setting processing in the case where the user may be reaccommodated at a different edge in the event of a failure or for equipment maintenance will be described.

Figure 14:
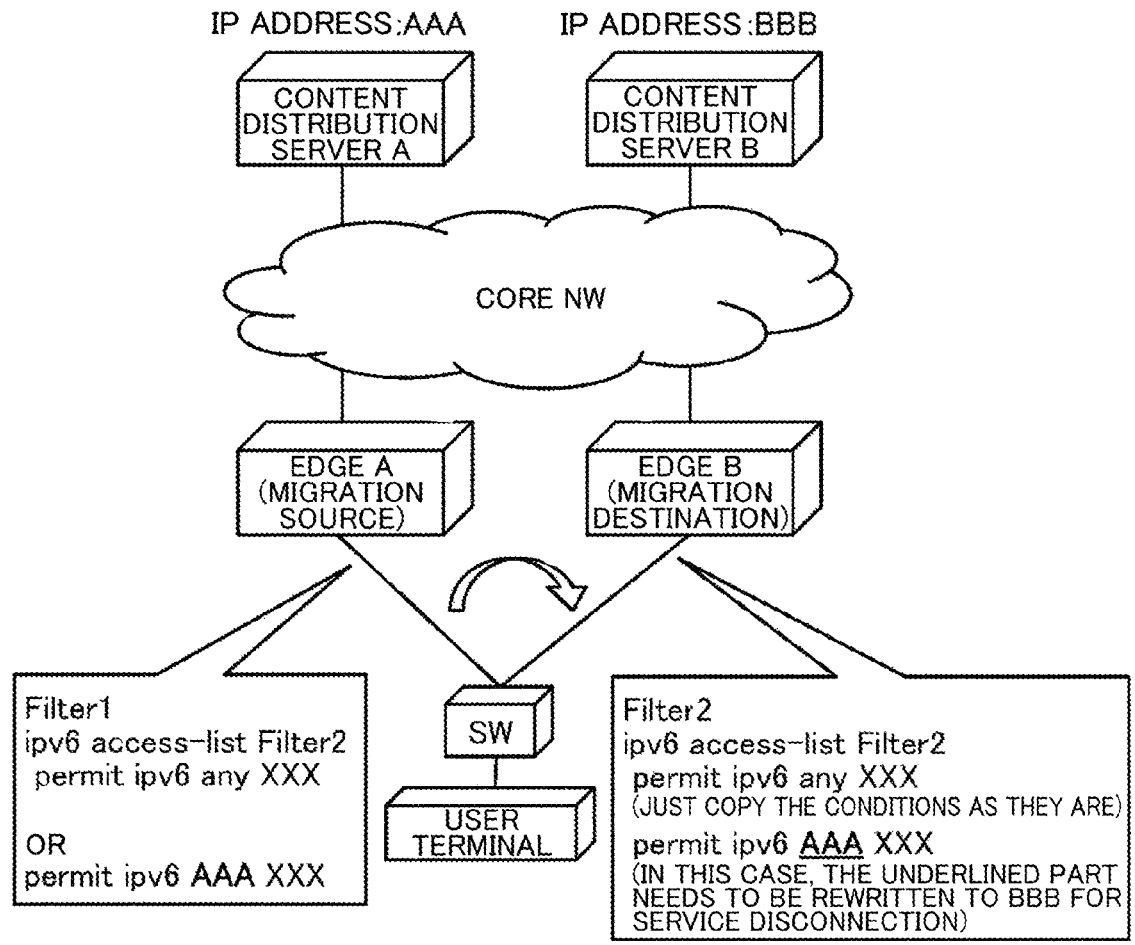
FIG. 14 is a diagram explaining a precondition according to an embodiment 2.

FIG. 14 is a diagram explaining a precondition in the embodiment 2. As shown in FIG. 14, a plurality of distribution servers for the same content are prepared for the purpose of load distribution or the like, and may share distribution destinations.

For example, it is assumed that the user terminal originally communicates with the outside via the edge A. If the edge A must be once stopped for the reason of maintenance, failure, etc., the user terminal accommodated in the edge A may be replaced with another edge for the purpose of continuing the service. On the other hand, the content distribution server A and the content distribution server B are operated by the same carrier, and both of them distribute the same content. The content distribution server A is used for the edge A, and the content distribution server B is used for the edge B to distribute the load.

In the embodiment 1, the condition of the source address described in the filter must be "any". On the other hand, if the user who has changed the content from the edge A to the edge B is the user of the content, further conditions are required to create a filter to be set to the edge B. For example, when the accommodating destination is changed from "Filter1" of the edge A (migration source) to "Filter2" of the edge B (migration destination), "Filter2" remains "permit ipv6 AAA XXX", that is, the IP address "AAA" of the content server A. In this case, since the service is cut off, it is necessary to rewrite the "AAA" portion of the "permit ipv6 AAA XXX" of the "Filter2" to the IP address "BBB" of the content server B.

Therefore, the filter setting device according to the embodiment 2, in order to receive the multicast of the same distributor by the transfer device 30 at the migration destination, by making configuration after specifying the source address of the distribution server (content server), can cope with the change of the transfer device 30 accommodating the user terminal 40.

Figure 15:
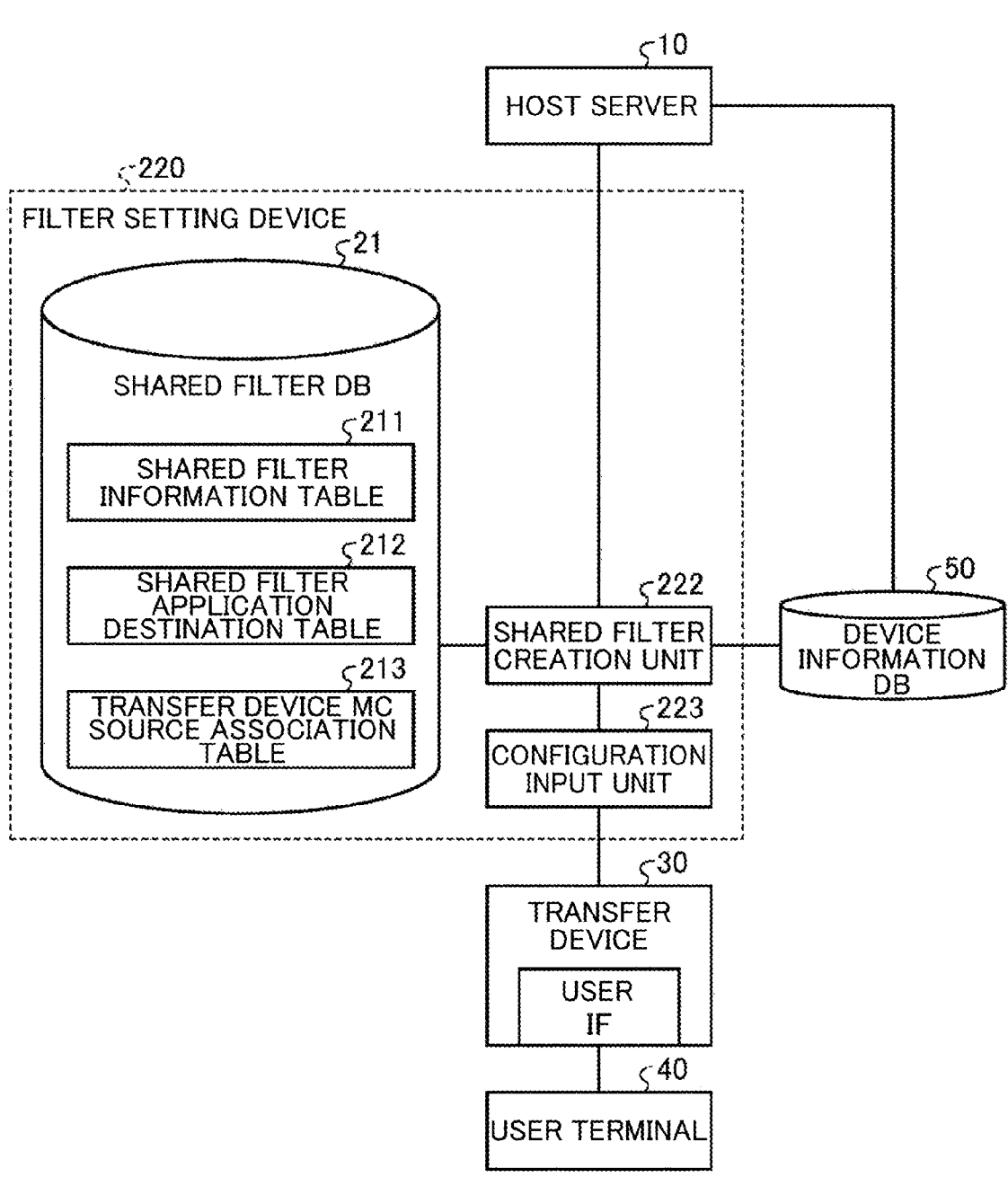
FIG. 15 is a diagram showing schematically an example of a network system according to the embodiment 2.

FIG. 15 is a diagram showing schematically an example of a network system according to the embodiment 2. As shown in FIG. 15, the network system according to the embodiment 2 has a filter setting device 220 in place of the filter setting device 20 shown in FIG. 4.

The filter setting device 220 includes a table in which a relationship between a transfer device 30 and a source address of a distribution server is recorded in a shared filter DB 21, specifies a source address for receiving multicast of the same distributor by the transfer device of a migration destination on the basis of information on the source address of the distribution server included in an input, a configuration is created. Thus, even when the transfer device 30 accommodating the user terminal 40 is changed, multicast reception from the distribution server can be performed.

[Filter Setting Device]

As shown in FIG. 15, the filter setting device 220 includes a shared filter DB 21, a shared filter creation unit 222 (creation unit), and a configuration input unit 223 (setting unit).

The shared filter DB 21 further has a transfer device MC source association table 213 (third table). The transfer device MC source association table 213 stores a relation between the transfer device 30 and a source address of a distribution server for distributing the MC in association with each other for each transfer device 30.

FIG. 16 is a diagram showing an example of the data structure of the transfer device MC source association table 213 shown in FIG. 15. As shown in FIG. 16, in the transfer device MC source association table 213, identification information of the transfer device, identification information of the distributor (distribution server), and a source address of the distribution server are recorded in association with each other. It is assumed that the contents of the transfer device MC source association table 213 are registered in advance by a maintenance person or the like.

The shared filter creation unit 222 has the same function as the shared filter creation unit 22. Then, the shared filter creation unit 222 refers to the transfer device MC source association table 213 on the basis of information on the source address included in the instruction from the host server 10, specifies the source address of the distribution server corresponding to the source address included in the instruction, and outputs the source address of the specified distribution server to the configuration input part 223. The shared filter creation unit 222 specifies a source address of a distribution server for receiving multicast of the same distributor in the transfer device 30 of a migration destination by a user terminal 40 on the basis of information of the source address included in an instruction from the host server 10, and then outputs information to the configuration input unit 223.

The configuration input unit 223 generates a configuration on the basis of the information output from the shared filter creation unit 222, and sets the shared filter in the transfer device 30 of the migration destination. In this case, the configuration input unit 223 by including, in the configuration, a source address of a distribution server identified for receiving multicast of the same distributor in the transfer device 30 of the migration destination, can set the shared filter appropriately to the user IF corresponding to the user terminal 40 to which the shared filter is applied. In addition, the configuration input unit 223, when there is a shared filter that is not used in the transfer device 30 of the migration source, instructs to delete the shared filter which is not used is given.

[Filter Creation Processing]

Figure 17:
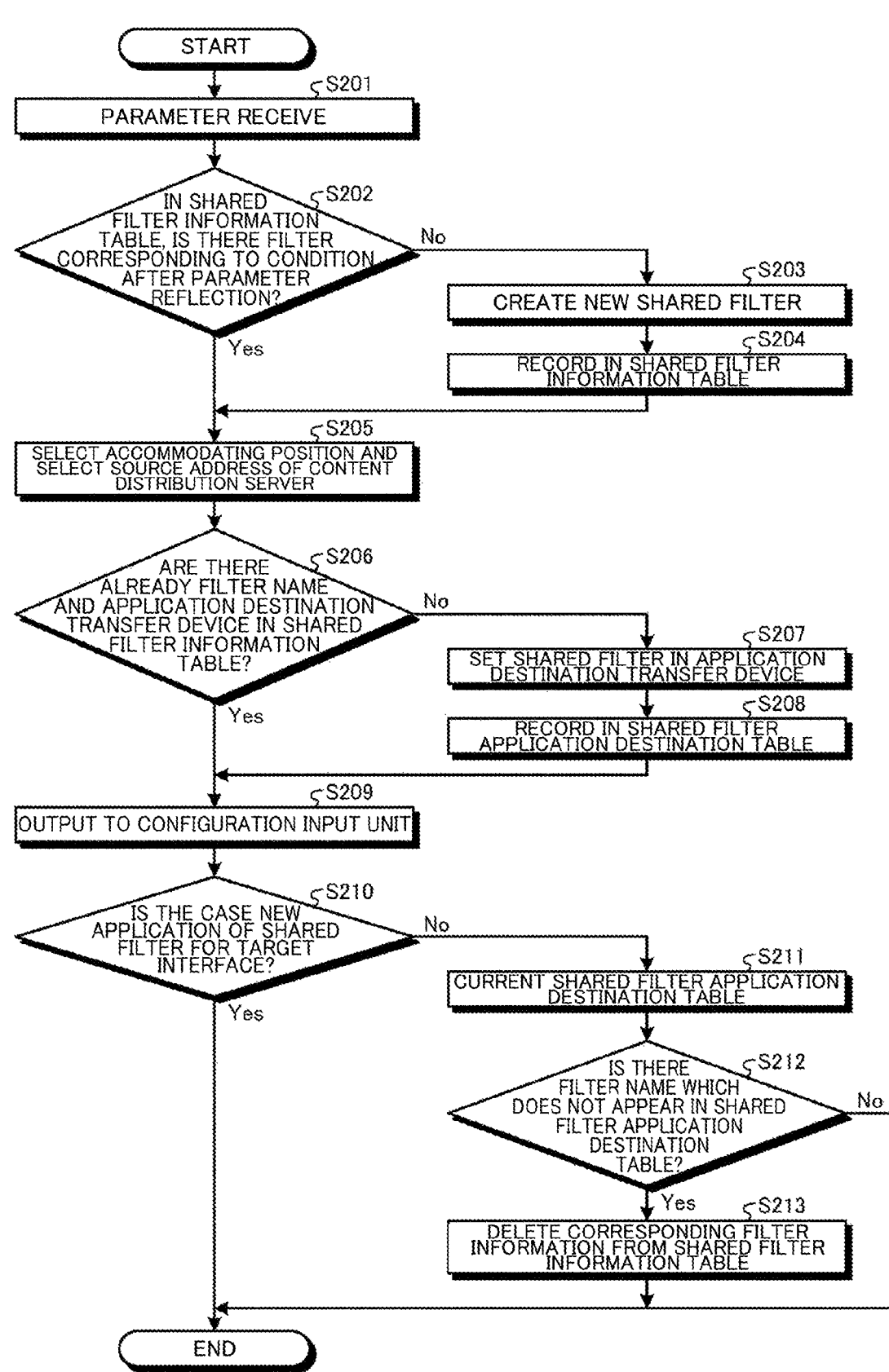
FIG. 17 is a flowchart showing a processing procedure of filter creation processing executed by the shared filter creation unit.

Next, a processing procedure executed by the shared filter creation unit 222 will be described. FIG. 17 is a flowchart showing a processing procedure of the shared filter creation unit 222 shown in FIG. 15.

As shown in FIG. 15, the shared filter creation unit 22 starts the filter creation process upon receiving parameters indicating the setting information of the shared filter from the host server 10 (step S201). The parameters include a filter condition, (a user identifier, a source address, a group address, and the like in the case of multicast), information of a transfer device 30 of a migration source of the user terminal 40 and user IF, information of transfer device 30 of a migration destination of the user terminal 40 and user IF information, etc.

A step S202 to a step S204 shown in FIG. 17 are the same processing as the step S2 to the step S4 shown in FIG. 10. The shared filter creation unit 222 selects an accommodating position on the basis of the filter condition, information of the transfer device 30 and user IF of a migration source of the user terminal 40, and information of the transfer device 30 and user IF information of a migration destination of the user terminal 40, selects an accommodating position and a source address of the content distribution server (step S205). Steps S206 to S213 shown in FIG. 17, are the same processes as the steps S6 to S13 shown in FIG. 10.

[Filtering Setting Processing]

Figure 18:
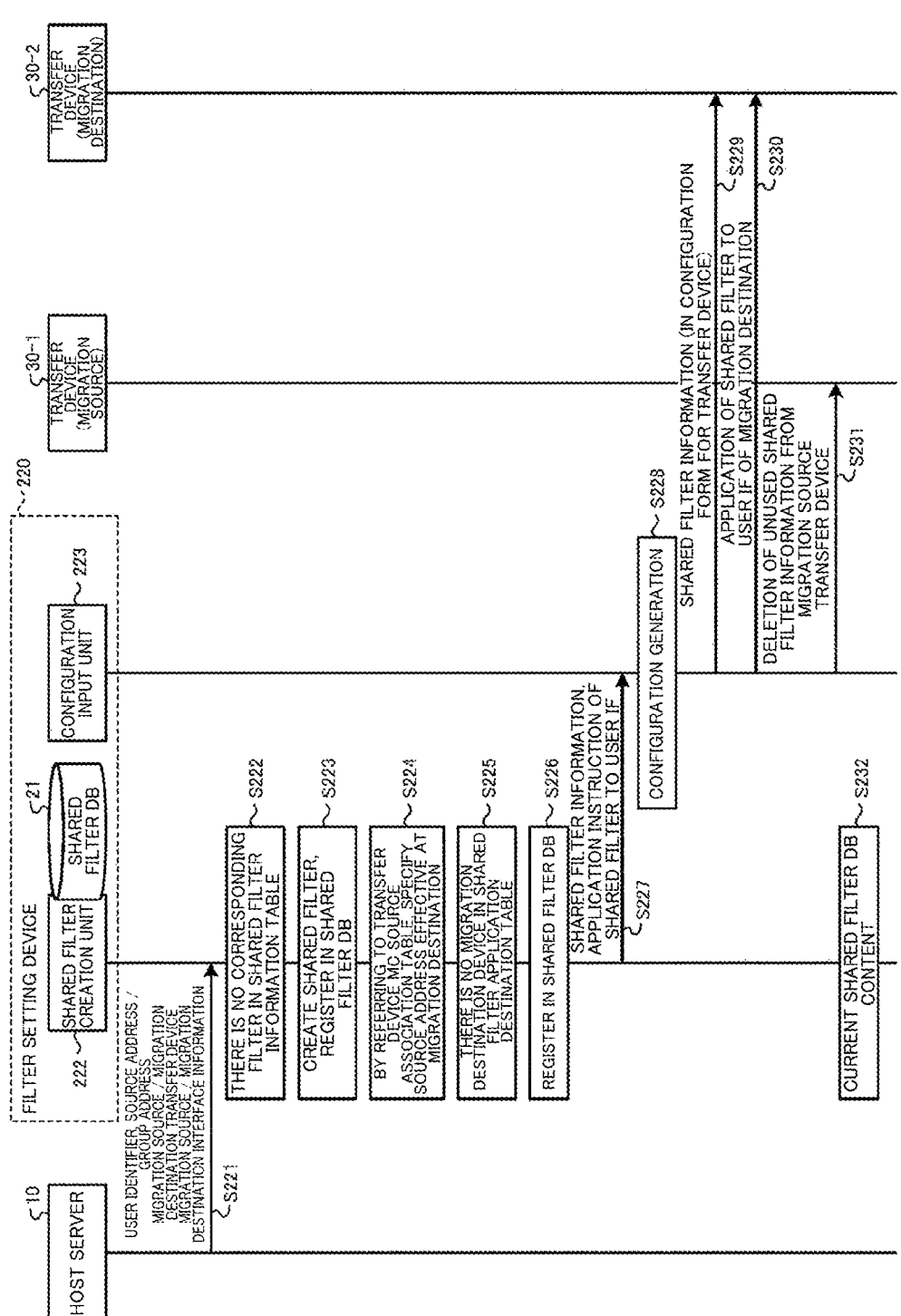
FIG. 18 is a sequence diagram showing a processing procedure of filter setting processing according to the embodiment 2.

Next, the filter setting processing executed by the filter setting device 20 will be described. FIG. 18 is a sequence diagram showing a processing procedure of the filter setting processing according to the embodiment 2.

In FIG. 18, a state in which a filter having the same condition as that of a filter set in the transfer device 30-2 has not been created in the past and which has not been applied to the transfer device 30-2, that is, in a state 4, the case where the user who is using the MC viewing service is migrated from the transfer device 30-1 to the transfer device 30-2 is shown. It is assumed that the shared filter creation unit 222 has already completed the migration between the transfer devices 30-1, and 30-2 of the user terminals.

As shown in FIG. 18, the host server 10 transmits parameters including a user identifier, a source address and a group address, identification information of the transfer device 30 at the migration source and migration destination, and user interface information of the migration source and migration destination to the filter setting device 220 (step S221).

In the filter setting device 220, the shared filter creation unit 222 collates input information with the shared filter information table 211 of a shared filter DB. Since there is no existing shared filter corresponding to the condition after the parameter reflection in the shared filter information table (step S222), the shared filter creation unit 222 creates a new shared filter, and registers the created shared filter in the shared filter information table 211 of a shared filter DB 21 (step S223). Subsequently, the shared filter creation unit 222 refers to a relation table between the transfer device 30 and the MC source, and specifies a source address effective at the transfer destination (step S224).

When the application destination device is not recorded in the shared filter application destination table 212, (step S225), the shared filter creation unit 222 records the shared filter, the transfer device 30 of the application destination, and the user IF to be set, in the shared filter application destination table 212 (step S226).

The shared filter creation unit 222 inputs information on a shared filter to be applied and an instruction (including a source address of distribution server) of applying the shared filter to the user IF, to the configuration input unit 223 (step S227). The configuration input unit 223 generates a configuration in accordance with input information by the shared filter creation unit 222 (step S228), and inputs a shared filter application command to the user IF and a shared filter application instruction to the user IF of the migration destination, to the transfer device 30-2 (step S229, S230).

Then, a configuration input unit 2232 instructs the transfer device 30-1 of the migration source to erase the shared filter information which has been not used from the transfer device 30-1 of the migration source (step S231). In the case of the state 4, since in the transfer device 30-1 of the migration source the processing is equal to the deletion of the user, when there is a shared filter which is not used by this processing, according to the instruction of a step S231, the corresponding shared filter is deleted from the transfer device 30-1.

The shared filter creation unit 222 currents the contents of the shared filter DB 21 by executing the step S10 to the step S13 of FIG. 10 (step S232). By this processing, when there is a shared filter which is not set in any transfer device 30, the held information is made to be present such as deletion from the shared filter DB 21.

Effects of Embodiment 2

As described above, the filter setting device 220 according to the embodiment 2 has a table in which the relationship between the transfer device 30 and the source address of the distribution server recorded in the shared filter DB 21. Then, the filter setting device 220 specifies the source address of the distribution server in order to receive the multicast from the same distribution server even in the transfer device 30 of the migration destination on the basis of the information of the source address of the distribution server included in the instruction from the host server 10, and then creates a configuration for applying the shared filter.

Thus, according to the embodiment 2, even when the transfer device 30 accommodating the user terminal 40 is changed, the shared filter can be appropriately set in the transfer device 30 of the migration destination, thus, the multicast from the distribution server can be smoothly received.

[System Constitution of Embodiment]

Each component of the filter setting device 20, 220 shown in FIG. 3 is a functional concept and does not necessarily need to be physically configured as shown in the drawing. That is, a specific form of distribution and integration of the functions of the filter setting device 20,220 is not limited to the shown in the diagrams, and all or some of the functions can be functionally or physically distributed or integrated in any unit according to various loads, usage conditions, and the like.

Further, the processing performed in the filter setting device 20,220 may be wholly or partially realized by a CPU, a GPU (Graphics Processing Unit), and a program that is analyzed and executed by the CPU and the GPU. Also, each process performed in the filter setting device 20 may be realized as hardware through wired logic.

In addition, the description of the embodiment, among the various kinds of processing, those automatically performed, in whole or part, may also be performed manually. Or, those performed manually, in whole or part, may be performed automatically in a known manner. In addition, the above-mentioned and shown processing procedures, control procedures, specific names, and information including various types of data and parameters can be appropriately changed unless otherwise specified.

[Program]

Figure 19:
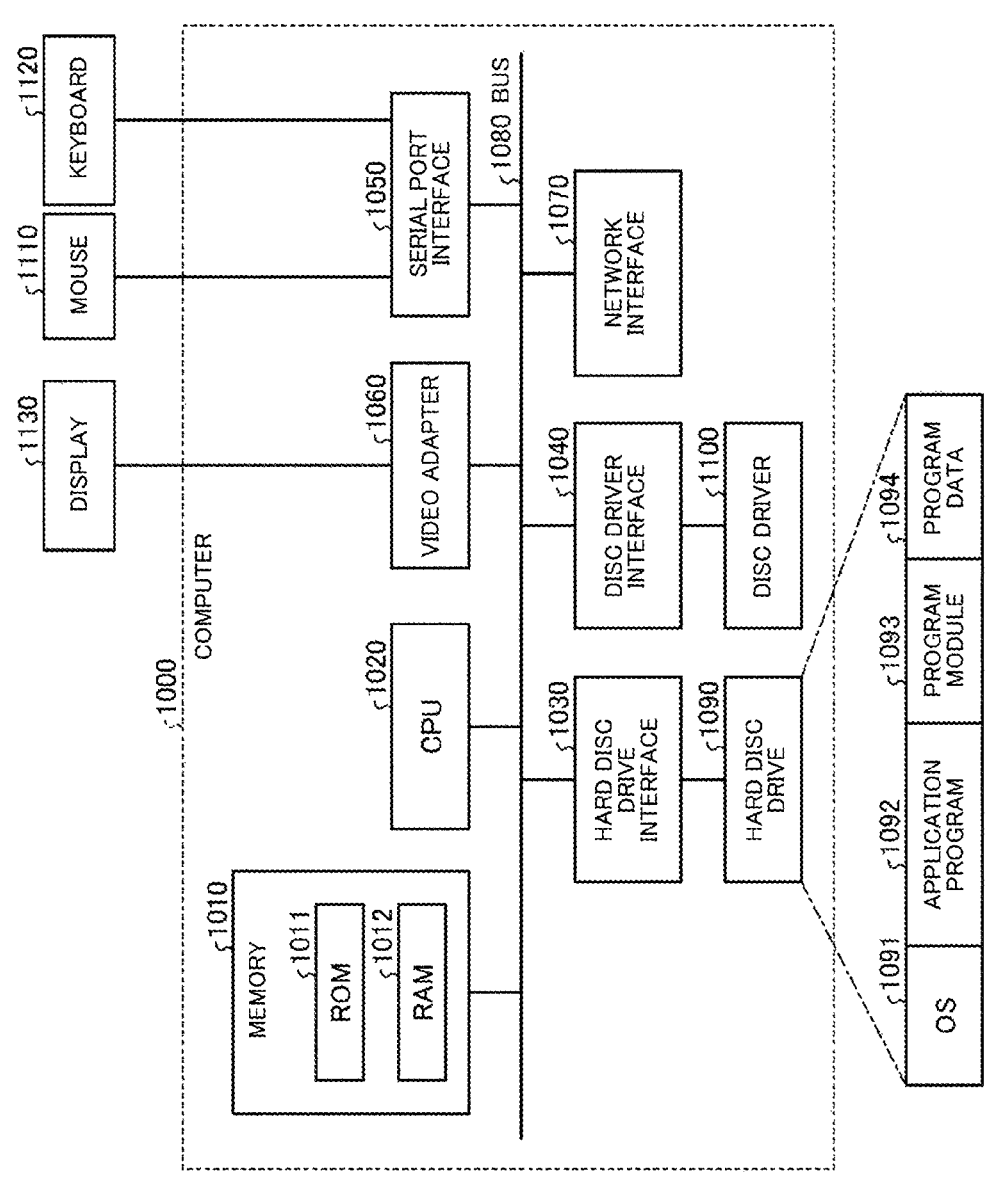
FIG. 19 shows one example of a computer that realizes a filter setting device by executing a program.

FIG. 19 shows one example of a computer that achieves the filter setting device 20,220 by executing programs. A computer 1000 includes, e.g., a memory 1010 and a CPU 1020. Further, the computer 1000 also includes a hard disk drive interface 1030, a disk drive interface 1040, a serial port interface 1050, a video adapter 1060, and a network interface 1070. These units are connected to one another via a bus 1080.

The memory 1010 includes a ROM 1011 and a RAM 1012. The ROM 1011 stores, for example, a boot program such as a BIOS (Basic Input Output System). The hard disk drive interface 1030 is connected to a hard disk drive 1090. The disc drive interface 1040 is connected to a disc drive 1100. For example, a removable storage medium such as a magnetic disk or an optical disc is inserted into the disc drive 1100. The serial port interface 1050 is connected to, for example, a mouse 1110 and a keyboard 1120. The video adapter 1060 is connected to, for example, a display 1130.

The hard disk drive 1090 stores, for example, an OS (operating system) 1091, an application program 1092, a program module 1093, and program data 1094. That is, the program that defines each process of the filter setting device 20,220 is implemented as the program module 1093 in which a code that can be executed by the computer 1000 is described. The program module 1093 is stored in, for example, the hard disk drive 1090. For example, the program module 1093 for executing the same processing as the functional configuration in the filter setting device 20,220 is stored in the hard disk drive 1090. Note that the hard disk drive 1090 may be replaced with a SSD (Solid State Drive).

Furthermore, the setting data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 into the RAM 1012 and executes them as necessary.

The program module 1093 and program data 1094 are not limited to being stored in the hard disk drive 1090, and may also be stored in, for example, a removable storage medium and read out by the CPU 1020 via the disk drive 1100. Alternatively, the program module 1093 and program data 1094 may be stored in other computers connected via a network (for example, LAN (Local Area Network) or WAN (Wide Area Network) or the like). Then, the program module 1093 and the program data 1094 may be read by the CPU 1020 from another computer via the network interface 1070.

Although the embodiment to which the invention made by the present inventor has been applied has been described above, the present invention is not limited by the description and the drawings that form a part of the disclosure of the present invention according to the present embodiment. That is, other embodiments, examples, operational techniques, and the like made by those skilled in the art or the like on the basis of the present embodiment are all included in the category of the present invention.

REFERENCE SIGNS LIST

10 Host server
20,220 Filter setting device
21 Shared filter DB
22,222 Shared filter creation unit
23,223 Configuration input unit
30 Transfer device
40 User terminal
50 Device information DB
211 Shared filter information table
212 Shared filter application destination table
213 Transfer device MC source association table

The invention claimed is:

1. A device for configuring Layer 3 multicast data transfer operations using a shared filter, comprising a processor configured to execute operations comprising:

determining, based on a Layer 3 data transfer technology using Internet Protocol (IP) addresses, reuse of shared filter by referring to a first table and a second table according to an instruction received from an host server, wherein the first table comprises a source IP address and a group IP address as filtering information of the shared filter, the second table comprises information of a data transfer device to which the shared filter is applied, and the instruction specifies the filtering information and the data transfer device;

creating a configuration of data filtering according to the determined reuse of the shared filter to be shared among a plurality of Layer 3 data transfer interfaces in the transfer device; and transmitting, based on the created configuration of data filtering, multicast data through the data transfer device.

2. The device according to claim 1, wherein when a user addition is instructed from the host server, and further when information of the shared filter corresponding to the instruction is in the first table and the transfer device accommodating a terminal of a user instructed to be added is in the second table, the determining further comprises determining that the shared filter corresponding to the instruction, and of another IF of the transfer device accommodating the terminal is shared.

3. The device according to claim 2, wherein when a user addition is instructed from the host server, and further when information of the shared filter corresponding to the instruction is in the first table and the transfer device accommodating the terminal of the user instructed to be added is not in the second table, the determining further comprises determining that the shared filter corresponding to the instruction is to be added to the transfer device accommodating the terminal of the user, and adding the transfer device accommodating the terminal to the second table as an application destination of the shared filter corresponding to the instruction.

4. The device according to claim 2 wherein, when information of a shared filter that is not recorded in the second table is recorded in the first table, the determining further comprises deleting the information of the shared filter from the first table.

5. The device according to claim 2, the processor further configured to execute operations comprising:

storing a third table for recording a source address of a distribution server for each of the transfer devices, wherein the instruction includes information of a source address;

specifying specifies a source address of the distribution server corresponding to the source address included in the instruction;

outputting the source address of the specified distribution server; and generating a configuration including the source address of the distribution server.

6. The device according to claim 1, wherein when a user addition is instructed from the host server, and further when information of the shared filter corresponding to the instruction is in the first table and the transfer device accommodating a terminal of a user instructed to be added is not in the second table, the determining further comprises determining that the shared filter corresponding to the instruction is to be added to the transfer device accommodating the terminal of the user, and adding the transfer device accommodating the terminal to the second table as an application destination of the shared filter corresponding to the instruction.

7. The device according to claim 6, wherein, when a user addition is instructed from the host server, and further when information of the shared filter corresponding to the instruction is not in the first table, the determining further comprises:

creating the shared filter corresponding to the instruction;

determining that the shared filter is to be applied to the transfer device accommodating the terminal of the user instructed to be added; and recording the created shared filter information and the application destination thereof in the first table and the second table.

8. The device according to claim 6, wherein, when a user addition is instructed from the host server, and further when information of the shared filter corresponding to the instruction is not in the first table, the determining further comprises:

creating the shared filter corresponding to the instruction;

determining that the shared filter is to be applied to the transfer device accommodating the terminal of the user instructed to be added; and recording the created shared filter information and the application destination thereof in the first table and the second table.

9. The device according to claim 1, wherein, when information of a shared filter that is not recorded in the second table is recorded in the first table, the determining further comprises deleting the information of the shared filter from the first table.

10. The device according to claim 1, the processor further configured to execute operations comprising:

storing a third table for recording a source address of a distribution server for each of the transfer devices, wherein the instruction includes information of a source address;

specifying specifies a source address of the distribution server corresponding to the source address included in the instruction;

outputting the source address of the specified distribution server; and generating a configuration including the source address of the distribution server.

11. A method for configuring Layer 3 multicast data transfer operations using a shared filter, comprising:

determining, based on a Layer 3 data transfer technology using Internet Protocol (IP) addresses, reuse of a shared filter by referring to a first table and a second table according to an instruction received from a host server, wherein the first table comprises a source IP address and a group IP address as filtering information of the shared filter, the second table comprises information of a data transfer device to which the shared filter is applied, and the instruction specifies the filtering information and the data transfer device;

creating a configuration of data filtering according to the determined reuse of the shared filter shared among a plurality of Layer 3 data transfer interfaces in the data transfer device; and transmitting, based on the created configuration of data filtering, multicast data through the data transfer device.

12. The method according to claim 11, wherein when a user addition is instructed from the host server, and further when information of the shared filter corresponding to the instruction is in the first table and the transfer device accommodating a terminal of a user instructed to be added is in the second table, the determining further comprises determining that the shared filter corresponding to the instruction, and of another IF of the transfer device accommodating the terminal is shared.

13. The method according to claim 11, wherein when a user addition is instructed from the host server, and further when information of the shared filter corresponding to the instruction is in the first table and the transfer device accommodating a terminal of a user instructed to be added is not in the second table, the determining further comprises determining that the shared filter corresponding to the instruction is to be added to the transfer device accommodating the terminal of the user, and adding the transfer device accommodating the terminal to the second table as an application destination of the shared filter corresponding to the instruction.

14. The method according to claim 13, wherein when a user addition is instructed from the host server, and further when information of the shared filter corresponding to the instruction is not in the first table, the determining further comprises:

creating the shared filter corresponding to the instruction;

determining that the shared filter is to be applied to the transfer device accommodating the terminal of the user instructed to be added; and recording the created shared filter information and the application destination thereof in the first table and the second table.

15. The method according to claim 11, wherein, when information of a shared filter that is not recorded in the second table is recorded in the first table, the determining further comprises deleting the information of the shared filter from the first table.

16. The method according to claim 11, further comprising:

storing a third table for recording a source address of a distribution server for each of the transfer devices, wherein the instruction includes information of a source address;

specifying specifies a source address of the distribution server corresponding to the source address included in the instruction;

outputting the source address of the specified distribution server; and generating a configuration including the source address of the distribution server.

17. A computer-readable non-transitory recording medium storing computer-executable program instructions that when executed by a processor cause a computer system to execute operations for configuring Layer 3 multicast data transfer operations using a shared filter, comprising:

determining, based on a Layer 3 data transfer technology using Internet Protocol (IP) addresses, reuse of a shared filter by referring to a first table and a second table according to an instruction received from a host server, wherein the first table comprises a source IP address and a group IP address as filtering information of the shared filter, the second table comprises information of a data transfer device to which the shared filter is applied, and the instruction specifies the filtering information and the data transfer device;

creating a configuration of data filtering according to the determined reuse of the shared filter shared among a plurality of Layer 3 data transfer interfaces in data transfer device; and transmitting, based on the created configuration of data filtering, multicast data through the data transfer device.

18. The computer-readable non-transitory recording medium according to claim 17, wherein when a user addition is instructed from the host server, and further when information of the shared filter corresponding to the instruction is in the first table and the transfer device accommodating a terminal of a user instructed to be added is in the second table, the determining further comprises determining that the shared filter corresponding to the instruction, and of another IF of the transfer device accommodating the terminal is shared.

19. The computer-readable non-transitory recording medium according to claim 17, wherein when a user addition is instructed from the host server, and further when information of the shared filter corresponding to the instruction is in the first table and the transfer device accommodating a terminal of a user instructed to be added is not in the second table, the determining further comprises determining that the shared filter corresponding to the instruction is to be added to the transfer device accommodating the terminal of the user, and adding the transfer device accommodating the terminal to the second table as an application destination of the shared filter corresponding to the instruction.

20. The computer-readable non-transitory recording medium according to claim 19, wherein when a user addition is instructed from the host server, and further when information of the shared filter corresponding to the instruction is not in the first table, the determining further comprises:

creating the shared filter corresponding to the instruction;

determining that the shared filter is to be applied to the transfer device accommodating the terminal of the user instructed to be added; and recording the created shared filter information and the application destination thereof in the first table and the second table.

\* \* \* \* \*